United States Patent [19]

Bauer et al.

[11] 4,006,201
[45] Feb. 1, 1977

[54] PROCESS FOR THE PRODUCTION OF POLYVINYL CHLORIDE GRAFT COPOLYMERS

[75] Inventors: Johann Bauer; Klaus Adler; Gerhard Beier; Heinz Hefner; Alex Sabel, all of Burghausen, Germany

[73] Assignee: Wacker-Chemie GmbH, Munich, Germany

[22] Filed: Sept. 3, 1974

[21] Appl. No.: 502,869

[30] Foreign Application Priority Data

Sept. 4, 1973 Germany .................... 2344553

[52] U.S. Cl. .............................. 260/878 R
[51] Int. Cl.$^2$ ................ C08F 263/00; C08L 31/04
[58] Field of Search ................. 260/878 R

[56] References Cited

UNITED STATES PATENTS

| | | | |
|---|---|---|---|
| 3,517,083 | 6/1970 | Salyer ........................... | 260/878 R |
| 3,761,542 | 9/1973 | Kosaka et al. ................. | 260/878 R |
| 3,789,083 | 1/1974 | Dumoulin ...................... | 260/878 R |
| 3,853,970 | 12/1974 | Dietrich ........................ | 260/878 R |

FOREIGN PATENTS OR APPLICATIONS

| | | | |
|---|---|---|---|
| 41,008 | 3/1971 | Japan ............................ | 260/878 R |
| 14,228 | 6/1968 | Japan ............................ | 260/878 R |

*Primary Examiner*—Alan Holler
*Attorney, Agent, or Firm*—Hammond & Littell

[57] ABSTRACT

A process for the production of polyvinyl chloride graft copolymers from ethylene/vinyl acetate copolymers and vinyl chloride by graft polymerization in the aqueous phase consisting essentially of adding a water-soluble, free-radical-forming polymerization catalyst to an aqueous dispersion of an ethylene/vinyl acetate copolymer optionally containing additional emulsifiers and/or dispersion stabilizers, heating said dispersion to the polymerization temperature, adding vinyl chloride gas above said agitated heated dispersion at such rate that the pressure is below the saturation pressure of vinyl chloride at the polymerization temperature, and recovering said polyvinyl chloride grafted copolymer.

6 Claims, 6 Drawing Figures

|←→|
0.1 MM

FIG.1 ——— S-PVC + 5% VAE
FIG.2 ——— S-PVC + 10% VAE
FIG.3 ——— S-PVC + 15% VAE
FIG.4 ——— S-PVC + 20% VAE
FIG.5 ——— S-PVC + 20% VAE +10% E-PVC
FIG.6 ——— VC-g-VAE (49.4% VAE)

PROCESS FOR THE PRODUCTION OF POLYVINYL CHLORIDE GRAFT COPOLYMERS

THE PRIOR ART

The graft polymerization of vinyl chloride on polymers is fundamentally known. Often, it is grafted on an elastomeric resin in order that chemical attachment, and an especially good distribution of the elastomeric resin in the PVC are attained. Mere mixing of PVC with such resins does not make it possible to attain these criteria, often because of lack of compatibility. Hence, finished parts made from such masses appear to be turbid.

Many different polymers have been proposed as the graft backbone in vinyl chloride polymerization. In this connection, ethylene/vinyl acetate copolymers were first mentioned in the Italian Pat. No. 621,868, Page 2, left column at the bottom. Furthermore, German Published Application (DAS) 1,495,694 has disclosed a process for the grafting of vinyl chloride on ethylene/vinyl acetate copolymers in which the copolymer is dissolved in vinyl chloride before the polymerization, and the polymerization is conducted under the conditions of suspension polymerization. This process is cumbersome and expensive on a technical scale since first, the copolymer has to be obtained as a solid and then, has to be homogeneously dissolved in vinyl chloride. This dissolving step takes a great amount of time, even at elevated temperatures. Moreover, the amount of dissolvable solid resin component is limited because of the rapidly increasing viscosity of the solution so that usually, one cannot exceed 10% to 15% by weight of the ethylene/vinyl acetate copolymer, based on the vinyl chloride. The stirring equipment has to be adapted to the increased energy requirement, which necessitates increased expenditure on an industrial scale. Graft copolymers prepared by this method yield more or less turbid molded pieces, depending upon the respective amount and ethylene content of the ethylene/vinyl acetate copolymer component.

OBJECTS OF THE INVENTION

An object of the invention is the development of a simple process for the graft polymerization of vinyl chloride on ethylene/vinyl acetate copolymers, which process can be carried out with the customary equipment for the manufacture of polyvinyl chloride by suspension polymerization.

Another object of the present invention is the development, in the process for the production of polyvinyl chloride grafted copolymers from ethylene/vinyl acetate copolymers and vinyl chloride which comprises graft polymerizing vinyl chloride onto an ethylene/vinyl acetate copolymer in an aqueous phase in the presence of a polymerization catalyst and optionally additional emulsifiers and/or dispersion stabilizers at a temperature and time sufficient to effect polymerization and recovering said polyvinyl chloride grafted copolymer, the improvement consisting of utilizing an ethylene/vinyl acetate copolymer dispersion in water in the presence of a water-soluble, free-radical-forming catalyst as said polymerization catalyst and adding vinyl chloride to the stirred reactants during polymerization at such a rate that the pressure is maintained below the saturation pressure of vinyl chloride at the polymerization temperature.

These and other objects of the invention will become more apparent as the description thereof proceeds.

THE DRAWINGS

DESCRIPTION OF THE INVENTION

Figure 1:
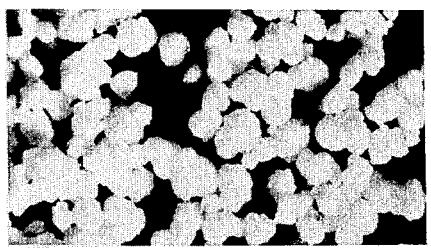
FIGS. 1 to 5 are photomicrographs of particles of polyvinyl chloride of the prior art.
Figure 2:
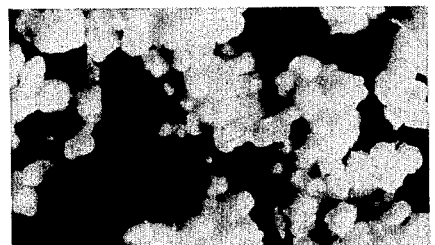
Figure 3:
Figure 4:
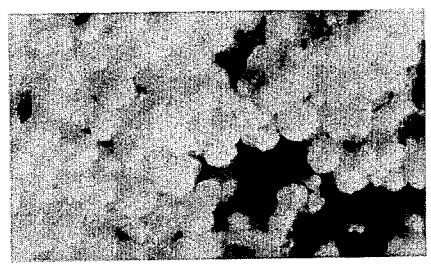

The drawbacks of the prior art have been overcome and the above objects have been achieved by a process in which polyvinyl chloride graft copolymers are manufactured from ethylene/vinyl acetate copolymers and vinyl chloride by graft polymerization in the aqueous phase, if necessary, in the presence of additional emulsifiers and/or dispersion stabilizers, characterized in that in the presence of a dispersion of an ethylene/vinyl acetate copolymer in water, water-soluble radical formers are used to polymerize vinyl chloride in such a manner that in each case, vinyl chloride is passed into the reaction space only to the extent as it is consumed in the polymerization, where stirring is used and the presssure is maintained below the saturation pressure corresponding to the chosen polymerization temperature.

More particularly, the present invention involves an improvement in the process for the production of polyvinyl chloride grafted copolymers from ethylene/vinyl acetate copolymers and vinyl chloride which comprises graft polymerizing vinyl chloride onto an ethylene/vinyl acetate copolymer in an aqueous phase in the presence of a polymerization catalyst and optionally additional emulsifiers and/or dispersion stabilizers at a temperature and time sufficient to effect polymerization and recovering said polyvinyl chloride grafted copolymer. The said improvement consists of utilizing an ethylene/vinyl acetate copolymer dispersion in water in the presence of a water-soluble, free-radical-forming catalyst as said polymerization catalyst and adding vinyl chloride to the stirred reactants during polymerization at such a rate that the pressure is maintained below the saturation pressure of vinyl chloride at the polymerization temperature.

The process of the invention results in powdery products which do not become tacky upon storage in bags, which have a homogeneous distribution of the copolymer in the PVC, and which can be processed to give transparent molded articles, especially sheets and non-rigid foils. The capacity of the powdery product for taking up plasticizers is excellent, which results in very good processing. From a theoretical viewpoint, this is surprising since copolymers of ethylene and vinyl acetate which have been prepared in aqueous emulsion are known to form cross-linked or branched products which are difficult to further process, see Bartl, Kautschuk and Gummi-Kunststoffe (Rubber - Plastics) 25, 452–455 (1972). Moreover, the process of the invention can be carried out in a simple manner since one can start directly with the dispersions which are obtained by the polymerization of ethylene and vinyl acetate and since a cumbersome solution step is obviated. The product obtained has the consistency of suspension PVC although dispersions prepared in aqueous emulsions and water-soluble catalysts are used as the starting materials. Thus, the use of coagulants for the working-up of the polymerization product is obviated.

Aqueous, mostly finely divided ethylene/vinyl acetate copolymer dispersions are used for producing the graft backbone. The solid content of these dispersions varies, in general, between 20% and 55% by weight. However, the solid content is not of great importance because in most cases, a further addition of water becomes necessary during the graft polymerization. The polymer mass is greatly increased by the grafting of the vinyl chloride. The ethylene content of the ethylene/vinyl acetate copolymers can vary within wide limits and customarily lies between 25% and 70% by weight, preferably around 30% to 60% by dry weight of the copolymer. The K-value of the ethylene/vinyl acetate copolymers mostly lies between 40 to 70, preferably between 50 and 60 (determined according to Fikentscher).

Such dispersions are manufactured by emulsion polymerization of ethylene and vinyl acetate with water-soluble polymerization catalysts in the presence of emulsifiers and protective colloids and, if necessary, in the presence of reducing agents. In principle, the known quantities of customary water-soluble catalyst systems, emulsifiers, and/or protective colloids can be charged. It is often advantageous to use dispersions which were produced with non-ionic emulsifiers or surface-active compounds, such as for example, mono esters or mono ethers of polyoxyalkyleneglycols with higher fatty acids or higher fatty alcohols, or condensation products of ethylene oxide with higher fatty acids, higher fatty alcohols, alkylated phenols having 6 to 20 carbon atoms in the alkyl, and polycondensation products of ethylene oxide and/or propylene oxide, as well as with protective colloids, especially cellulose derivatives, for example, methylcellulose, ethylcellulose and carboxymethylcellulose, all having various viscosities whereby in each case, the amounts of protective colloids or emulsifiers is from 0.4% to 2%, based on the solid content of the finished dispersion. A process for the manufacture of such ethylene/vinyl acetate copolymer dispersions is, for example, described in DAS No. 1,133,130.

The process of the invention can be carried out continuously (for example, by cascade polymerization) or also discontinuously whereby one used autoclaves of the type employed in the manufacture of S-PVC (suspension PVC). An extraordinary increase in viscosity which would necessitate an enlargement of the stirring provisions is not to be feared even when the content of the ethylene/vinyl acetate copolymer dispersion considerably exceeds 15% by weight, based on the vinyl chloride content.

The aqueous dispersion of the ethylene/vinyl acetate copolymer is introduced into a reaction vessel, customarily, into an autoclave, equipped with a stirrer and a proportioning feeding device. It is likewise possible to add the ethylene/vinyl acetate dispersion during the vinyl chloride polymerization or to partially preformed PVC. The amount of the ethylene/vinyl acetate copolymer component is so adjusted that, in general, the finished graft product contains between 10% to 60% by weight of the ethylene/vinyl acetate copolymer.

Furthermore, water (mostly deionized water) is added. Such amounts are added that a suspension containing 30% to 50% solids is formed by the graft polymerization.

All the auxiliary polymerization agents, as for example, the water-soluble initiators, emulsifiers and/or protective colloids, can be either charged or part of these agents can be added by proportioning during the polymerization.

Examples for water-soluble free-radical-formers are peroxides such as perphosphates, water-soluble salts of peroxydisulfuric acid, as for example, ammonium persulfate, sodium persulfate and potassium persulfate, and hydrogen peroxide. The amounts charged are not critical (in general, 0.01% to 1% by weight, based on the vinyl chloride). If necessary, reducing agents can also be charged.

The addition of emulsifiers and/or protective colloids is not necessary in all cases, since such substances are already present in the ethylene/vinyl acetate copolymer dispersion which is charged. Examples of such emulsifiers are anionic, cationic and nonionic surface-active compounds, such as for example, alkylsulfates, alkanesulfonates, alkylbenzenesulfonates, alkylnaphthalenesulfonates, esters of sulfosuccinic acid, partial esters of phosphoric acid, alkylammonium salts, polyhydric alcohols partially esterified with fatty acids, as for example, esters of fatty alcohols with sulfuric acid, partially etherified polyalcohols, condensation products of alkylene oxides with higher fatty acids or higher fatty alcohols or alkylphenols. In general, quantities of 0.05% to 1% by weight are used.

Examples of protective colloids are polyvinyl alcohol and its derivatives, cellulose derivatives, such as methylcellulose, carboxymethylcellulose, hydroxyethylcellulose, hydroxypropylcellulose, copolymers of maleic acid or its mono esters with styrene. In general, the quantities used are 0.05% to 1% by weight.

Further polymerization auxiliaries which are optionally employed are for instance, molecular weight regulators, such as for example, aliphatic aldehydes having 2 to 4 carbon atoms, chlorinated hydrocarbons, such as for example, dichloroethylene, trichloroethylene, chloroform, methylene chloride, mercaptans, propene and isobutene, as well as buffering agents, such as for example, sodium carbonate, sodium bicarbonate, alkali metal acetates, borax and alkali metal phosphates.

The graft polymerization is carried out in the usual manner at a temperature between 40° and 80° C, corresponding to the desired K-value of the end product.

The vinyl chloride is so charged in the stirred reaction mass in the autoclave that the saturation pressure of the vinyl chloride at the polymerization temperature is not attained. Since saturation pressure denotes the pressure at which vinyl chloride liquefies under the given conditions, no liquid phase of vinyl chloride exists in the reaction vessel. Preferably, the pressure ranges from over 5 atmospheres to barely under the saturation pressure.

The exceeding of the saturation vapor pressure is prevented by a pressure control in the autoclave. In a simple manner, the proportionate charging required by the process according to the invention can be carried out by a pressure-dependent proportioning pump or a pressure-dependent regulating valve which is connected with the storage tank of vinyl chloride being under the pressure of an inert gas.

As to the stirring regime during the graft polymerization, it has proven advantageous to stir slowly at the start of the graft polymerization up to about half-conversion, for example, within the range of between 40 and 80 rpm, and to stir faster during the second half of the graft polymerization, for example, within the range of between 100 to 150 rpm.

The product obtained shows the characteristics of a suspension-polymerized polyvinyl chloride. It can be accordingly worked up, for instance, by separation from the aqueous phase, for example, by filtration, washing and drying.

The products which have been prepared according to the process of the invention can be utilized in numerous fields. The products of the invention are especially suited for the manufacture of sheets of non-rigid foils that are clear as glass, free from spots, and resistant to aging. Moreover, the graft products can be blended with PVC to obtain PVC masses which are impact resistant. As compared to the direct blending of ethylene/vinyl acetate copolymers with PVC, the products according to the invention have the advantage that in contradistinction to ethylene/vinyl acetate copolymers, they are not tacky, hence, can be blended with PVC without any difficulties. The graft products are also distinguished by their good processability and their excellent resistance to water. The share of vinyl chloride in the graft copolymer product is, in general, 30% to 95% by weight, preferably 40% to 90% by weight.

The following examples are illustrative of the invention without being limitative in any manner.

EXAMPLES 1 to 5

COMPARATIVE EXAMPLES

A dispersion of vinyl acetate/ethylene copolymer which has been prepared with nonylphenol polyethyleneglycol ether and methylcellulose according to German Pat. No. 1,133,130, has the following characteristics:

Solid Content of the Aqueous Emulsion — 41.6%
Ethylene Content of the Dry Substance — 36.6%
K-Value (in Cyclohexanone) — 54

Figure 5:
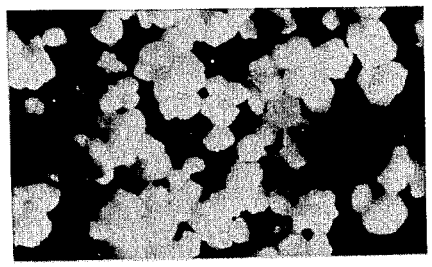

This vinyl acetate/ethylene copolymer emulsion was diluted with distilled water to a solid content of 2.5, 5.0, 7.5, or 10% by weight respectively. 100 parts of the respective diluted emulsions were stirred with 50 parts of suspension PVC which had a screen classification of <0.5 mm and then, 40 ml of a 27% sodium chloride brine were added. Upon subsequent heating to 65° C, the emulsion completely coagulated so that filtration resulted in a clear filtrate. The resin was washed until free from soluble chloride and was dried at 50° C. The dry product thus obtained was evaluated in Table I, Examples 1 to 4 and in the Figures 1 to 4. The product named in Table I, Example 5 and shown in FIG. 5 was obtained by adding a further portion of a PVC emulsion amounting to 10% by weight (based on the resin portion) to the mixture of 10% by weight of vinyl acetate/ethylene copolymer emulsion and 50 parts of suspension PVC prior to coagulation, in order to prepare a non-tacky, solid elastomeric product using two-step coagulation according to DAS 1,694,918.

In order to characterize the transparency, molded sheets of 4 mm thickness were prepared according to the following general specifications. 100 parts of the elastomeric resin was mixed with two parts of tin stabilizer ("17 Mol"), a sulfur containing dioctyltin stabilizer, and one part of a lubricating wax ("Wachs OP"), a partially saponified ester wax, acid number = 10–15, saponification number = 100–115. This mixture was rolled into a tough sheet at 175° C for 7 minutes and finally compression molded in a molding press likewise at 175° C for 7 minutes to form a sheet of 4 mm thickness. This molded sheet was so interposed into the path of a beam of visible light that one time, position 1, it was placed approximately in the middle between the light source (an incandescent lamp) and the photometer (selenium cell) and another time, position 2, it was placed immediately before the selenium cell. The attenuation of the light intensity as compared with that of the unrestricted light beam (attenuation = zero) was in the first case (position 1) an indication of the turbidity which was composed of scattering and pure absorption whereas in the second case (position 2), only the absorption was measured. The measuring of the attenuation of the light intensity was reported in percent of total darkness (= 100%). The turbidy and absorption values which were so found, are listed in Table I. The measured values listed were obtained from two determinations.

TABLE I

| Mixtures of S-PVC and VAc/C$_2$H$_4$ Emulsion | | | |
|---|---|---|---|
| Example | VAc/C$_2$H$_4$ p.b.w.* | E-PVC p.b.w.* | Turbidity % | Absorption % |
| 1 | 5 | — | 30 | 20 |
| 2 | 10 | — | 31 | 22 |
| 3 | 15 | — | 38 | 25 |
| 4 | 20 | — | 38 | 27 |
| 5 | 20 | 10 | 64 | 48 |

*parts by weight refer to 100 parts by weight of S-PVC

The appearance of the resin mixture according to Example 1 to 5 is illustrated by the photographs of FIGS. 1 to 5. It can be described as follows:

APPEARANCE

Example 1 — slightly cemented particles which could be triturated through a 0.5 mm sieve. Sieve analysis < 0.5 mm was not possible.

Example 2 — cemented grain, could be only partially triturated through a 0.5 mm sieve. Sieve analysis was impossible.

Example 3 — almost totally cemented lumps, could no longer be triturated.

Example 4 — totally cemented mass.

Example 5 — hard lumps, difficult to triturate, sieve analysis impossible.

EXAMPLE 6

In a 2000 liter autoclave equipped with stirrer, 180 parts by weight (on the solids content) of the vinyl acetate/ethylene copolymer dispersion mentioned in Example 1 were mixed with 747 parts by weight of totally deionized water. 0.36 part by weight of sodium lauryl sulfate and 0.56 part by weight of ammonium persulfate, as well as 0.84 part by weight of sodium bicarbonate were dissolved in the aqueous phase. The vapor space of the autoclave was scavenged with an inert gas in known manner and evacuated. After the autoclave had been heated up to 55° C, 60 parts by weight vinyl chloride was passed in while stirring the mixture at a rate of 60 rpm until the pressure in the autoclave reached 7 atm. Polymerization started immediately, which could be recognized by the thermal effect while at the same time, the pressure dropped. So much vinyl chloride as was consumed in the polymerization was then supplied while maintaining a pressure of 7 atm. in the autoclave. After 85 parts by weight of vinyl chloride had been absorbed, the rate of stirring was increased to 120 rpm. and an additional 85 parts by weight of vinyl chloride were supplied at this rate of stirring. Then, the polymerization was stopped after a reaction time of 6.7 hours. After decompression, cooling, filtration, washing and drying in a rotary drier, a non-tacky powder was obtained having the following characteristics:

Bulk Density: 431 gm/liter

| mm Sieve | Sieve Analysis (Alpine Air Jet Sieve) | | | | | | | |
|---|---|---|---|---|---|---|---|---|
| | 0.5 | 0.3 | 0.25 | 0.2 | 0.15 | 0.1 | 0.06 | D |
| % | 0.4 | 0.8 | 0.4 | 1.2 | 1.2 | 10.0 | 31.6 | 54.4 |

K-Value in Cyclohexanone: 61.3
Vinyl acetate/Ethylene Content: 49.4% by weight

Figure 6:
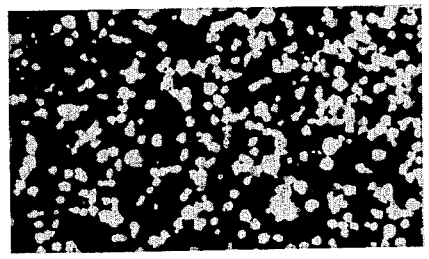
FIG. 6 is a photomicrograph of particles of the polyvinyl chloride graft copolymers of the invention.

FIG. 6 shows a photograph of the powder which could be sieved. For optical measurements, a molded sheet of 4 mm thickness was used (the preparation of which and the measuring method have been described in Example 1–5). The values found were:

Turbidity: — 30%
Absorption: — 18%

Although in this case, the vinyl acetate/ethylene content was more than double that of Examples 4 and 5, the turbidity and absorption of the molded sheet made from the graft copolymer according to the invention were still smaller.

EXAMPLE 7

The starting material, a vinyl acetate/ethylene copolymer dispersion was prepared according to German Pat. No. 1,133,130 (condensation product of ethylene oxide and propylene oxide/methyl cellulose) and had the following characteristics:

Solid Content of the Aqueous Emulsion: — 42.8%
Ethylene Content of the Dry Resin: — 34.0%
K-Value: — 56

Analogously to Example 6, a 2000 liter autoclave made of stainless steel and equipped with a stirrer was used, into which 150 parts by weight (dry weight) of the above dispersion and 1000 parts by weight of fully deionized water were stirred (at a rate of 60 rpm). Dissolved in the water were 0.3 part by weight of sodium lauryl sulfate, 0.5 part by weight of ammonium persulfate, and 0.7 part by weight of sodium bicarbonate. After the oxygen of the air had been removed from the vapor space of the autoclave by inert gas, heating was started, and 51 parts by weight vinyl chloride was passed in at 55° C so that the pressure in the autoclave reaches 7.0 atm. Polymerization started immediately, which can be recognized by the thermal effect while, at the same time, the pressure dropped. Corresponding to the pressure drop, so much vinyl chloride was supplied that the pressure in the autoclave did not exceed 7.0 atm. After 70 parts by weight had been introduced into the autoclave in this manner, the rate of stirring was increased to 120 rpm, and additional 70 parts by weight of vinyl chloride were proportioned into the autoclave. As soon as this quantity had been absorbed, the polymerization was stopped after a reaction time of 4.8 hours. After decompression, cooling, washing, and drying in a rotary drier, a non-tacky powder was obtained having the following characteristics:

Bulk Density: 416 gm/liter

| mm Sieve | Sieve Analysis: (Alpine Air Jet Sieve) | | | | | | | |
|---|---|---|---|---|---|---|---|---|
| | 0.5 | 0.3 | 0.25 | 0.2 | 0.15 | 0.1 | 0.06 | D |
| | — | 2.0 | 2.0 | 4.8 | 2.0 | 9.6 | 42.8 | 36.9 |

K-Value in Cyclohexanone: — 61.3
Vinyl Acetate/Ethylene Content: — 55.5%

The powdery graft polymer did not tend to tackiness or blocking when stored or piled in bags.

A molded sheet of 4 mm thickness which was used for optical measurements gave the following values:

Turbidity: — 30%
Absorption: — 19%

Although the vinyl acetate/ethylene content reached almost three times the value of the sample of Example 4, the optical values of the molded sheet in Example 7 were even better.

The preceding specific embodiments are illustrative of the practice of the invention. It is to be considered, however, that other expedients known to those skilled in the art, or recited herein, may be employed without departing from the spirit of the invention or the scope of the appended claims.

We claim:

1. In the process for the production of polyvinyl chloride grafted copolymers from ethylene/vinyl acetate copolymers and vinyl chloride which comprises graft polymerizing vinyl chloride onto an ethylene/vinyl acetate copolymer in an aqueous phase in the presence of a polymerization catalyst at a temperature and time sufficient to effect polymerization and recovering said polyvinyl chloride grafted copolymer, the improvement consisting of utilizing an ethylene/vinyl acetate copolymer dispersion in water in the presence of a water-soluble, free-radical-forming catalyst as said polymerization catalyst and adding vinyl chloride to the stirred reactants during polymerization at such a rate that the pressure is maintained below the saturation pressure of vinyl chloride at the polymerization temperature.

2. The process of claim 1 wherein said ethylene/vinyl acetate copolymer dispersion contains from 25% to 70% by weight on the dry basis of ethylene monomer units and sufficient vinyl chloride is added whereby the final graft copolymer product contains from 30% to 95% by weight on the dry basis of vinyl chloride monomer units.

3. The polyvinyl chloride grafted copolymer produced by the process of claim 1.

4. The process of claim 1 wherein said aqueous phase contains from 0.05% to 1% by weight, based on the total amount of vinyl chloride of a dispersant selected from the group consisting of anionic surface-active compounds, cationic surface-active compounds, nonionic surface-active compounds, protective colloids, and mixtures thereof.

5. The process of claim 1 wherein said water-soluble free-radical-forming catalyst is employed in an amount of from 0.01% to 1% by weight, based on the total amount of vinyl chloride.

6. The process of claim 1 wherein said water-soluble free-radical-forming catalyst is selected from the group consisting of water-soluble perphosphates, water-soluble persulfates and hydrogen peroxide.

* * * * *